United States Patent Office 2,970,924
Patented Feb. 7, 1961

2,970,924

GLASS BATCH PREPARATION

Joseph C. Fox, 3540 Queenswood, and Delos M. Palmer, 4156 Indian Road, both of Toledo, Ohio No Drawing. Filed May 29, 1959, Ser. No. 816,706

6 Claims. (Cl. 106—52)

The present invention relates to a glass batch and a method of preparing the same.

In modern glass technology, very large quantities of mixed raw materials are required daily for delivery to the melting furnaces and the handling and mixing of these materials presents a major problem.

Initially, the various constituents of a glass batch are weighed to the required amounts. Then these constituents are intimately mixed to provide a homogeneous mass. For small batches, such as are used in pot furnaces, the constituents are mixed by hand, but for the larger furnaces requiring considerable quantities of materials, it is the general practice to mix the various constituents of the batch by machines.

The dry mixed batch containing the various constituents such as silica, soda, ash, lime, borax, lead compounds and others including cullet is then charged into the melting furnaces, either by mechanical feeding as in the case of large installations or by shovelling manually into the smaller pot furnaces.

With this method of charging the dry powdery mixture into the furnaces, no matter how intimately mixed before hand or how well fed into the furnaces, a number of problems arise in the glass melting step in the manufacture of glass. Among these problems are the lack of homogeneity, melt segregation, dusting, volatilization of some constituents, cords, seeds, striae and high rejections of the finished product.

The above problems are caused by the dry mixing of materials having different chemical and physical characteristics. It is practically impossible to obtain complete uniformity with different densities and the other characteristics peculiar to the various components of a glass batch. Manifestly, when a glass batch which consists of these various components having different properties is heated, those components having the lowest melting points will melt or go into solution first and, in liquid form, segregate from the other components last to melt or be taken into solution. The liquid resulting from this initial melting is generally far removed from the desired composition of the finished glass and approaches this only as rapidly as the less soluble materials, such as silica, are taken in solution. Even after all the batch is converted to the liquid state, there may be non-uniformity of the glass resulting from segregation of the batch, indicated by the presence of cords and striae. These non-uniformities have been regarded as hard to eliminate because diffusion process takes place at a very low rate due to the high viscosity of molten glass. As a result, striae and cords exist in the molten material unless the glass is held in molten condition for a length of time, extending in certain instances to days, or unless some manner of mixing is employed. However, most mixing procedures are too costly to be commercially expedient and at best are only partially successful in attaining the desired end.

The present invention has been found to overcome or minimize some of the present difficulties in glass melting technology.

Essentially, the invention is concerned with the preparation of a glass batch composition by pelletizing the mixture in such a manner that each pellet, no matter what the size or conformation is chemically and physically uniform, resulting in more effective heat transfer to the batch materials, faster and more even melting, and production of a homogeneous melt without the usual defects associated with conventional practice.

The use of a pelletized innstead of a powdered mixture eliminates dusting, minimizes segregation of constituents, gives faster, and more uniform melting and results in less rejections and a more uniform product. The fining time is thereby greatly reduced, as glass batches prepared in accordance with the invention have less gases to get rid of at the outset of melting. Pelletizing the glass batch lends itself to the use of materials not now commonly used and varying particle size and size range of the various constituents of the batch is eliminated as an important factor.

Our improved method comprises adding to a premixed glass batch of the required composition, a small amount of a dispersing agent and a sufficient amount of water to dampen the batch, which will vary with varying proportions of the soluble constituents of the batch and with the particle size and other properties of the batch components. Finely ground cullet may also be added if desired.

It is an object of the present invention to produce a glass batch which will overcome the above mentioned disadvantages and produce glass that is clear and homogeneously liquid, free from defects such as bubbles or "seeds" which are caused by intrained gases, free from "stones" which are undissolved particles or crystals or bits of refractory, and free from "cords" or "striae" which are glassy inclusions possessing optical and other properties different from the surrounding glass.

In accordance with the present invention, the various constituents of the glass batch, such as sand, soda ash, feldspar, lime, alumina, borax and others, including cullet, are mixed together with small amounts of lignosulfonic acid salts and a small amount of water. It has been found that the use of lignosulfonic acid salts added in small amounts to glass batch mixtures, dampened with water, will not only act as a good dispersion agent but will also set up and harden in a short period of time to greatly aid in the ready formation of pellets without requiring the addition of external heat.

It has been found that the alkali metal salts—such as lithium, sodium and potassium and the alkaline earth metal salts such as magnesium, calcium, strontium and barium or any mixture of such salts are satisfactory for the instant process. Ammonium lignosulfonate is also satisfactory. All of these salts may be conveniently designated as salts or "alkali-forming" metals.

The lignosulfonic acid salts are derived as byproducts of the wood pulping industry. Such byproducts usually contain in addition to lignosulfonates, other organic and inorganic materials. However, it has been found that these other materials, other than the lignosulfonates, do not interfere with the intended use of such byproducts. In fact, it is preferable to use such byproducts as a source of lignosulfonic acid salts in preference to any specially prepared pure salts, because of their availability and relatively low cost.

The amounts of lignosulfonates necessary to produce the desired results may range from 0.05 to 2% of the weight of the glass batch, the amount depending upon the type of glass batch, its chemical composition and its particle size. For a very finely ground glass mixture such as is used in the production of fiber glass, a minimum amount of 0.10% of the lignosulfonic acid salts may be used. For coarser glass batch mixtures, such as are used in plate, window and container glasses, higher proportions of the salts are necessary.

The following represent formulae which may be employed in the preparation of batch material for the manufacture of glass:

Example I

For general use on various types of glass batches other than for fiber glass the following formula gives effective results:

| | Percent |
|---|---|
| Glass batch mixture | 89.5 |
| Lignosulfonic acid salts | 0.5 |
| Water | 10.0 |

Example II

For fiber glass batches and similar finely ground batches the following formula is effective:

| | Percent |
|---|---|
| Glass batch mixture | 91.80 |
| Lignosulfonic acid salts | 0.20 |
| Water | 8.00 |

The lignosulfates in these formulae may be the individual salts—calcium lignosulfonate, barium lignosulfonate, magnesium lignosulfonate, sodium lignosulfonate, potassium lignosulfonate, ammonium lignosulfonate or mixtures of any two or more of these.

In the manufacture of alkali-free glass which must be relatively free of the alkali metals, lithium, sodium or potassium, only the alkaline earth metal salts, such as calcium, barium, and strontium salts and ammonium lignosulfonate are used. In other glass, where alkali metal compounds are regularly required and used, any of the lignosulfonates can be applied.

It must be understood the invention is not restricted to the above formulae as in some cases it may be desirable to use larger amounts up to 2.00% or smaller amounts below 0.20%.

The procedure in the production of glass batch pellets made in accordance with the present invention is as follows: To the premixed powdered glass batch, the required amount of the lignosulfonates are added in the dry state and then the required amount of water is mixed in and the damp mixture is directly pelleted in a drum or in one of the many types of rotary pelletizing machines. Instead of adding the dry lignosulfonates to the glass batch mix, they may be dissolved in the required amount of water and the resulting solution added to the glass batch.

The use of pelletized glass batches produced in accordance with the invention result in the following advantages:

(1) Since each pellet is of uniform composition the glass melt made therefrom will be homogeneous and clear.

(2) Heat transfer through the melted batch is accelerated and homogeneity is promoted by pelletizing or compression of the various materials.

(3) Reduced handling time.

(4) Loss through dusting and volatilization is greatly reduced.

(5) The pelletized batch does not take up water on storage as do some of the individual constituents such as soda ash, lime, borax—thus eliminating some of the storage problems.

(6) Less attack on refractories.

(7) Less fining and planing time.

(8) Finely ground sand which passes through 100 mesh screen, now usually discarded because of dusting in ordinary mixing operations, can readily and conveniently be used by this pelletizing process. In fact it would be advantageous to use very finely divided sand and other constituents.

(9) In the case of leaded glasses, one of the difficulties met with is the tendency of lead oxide to dust, volatilize, segregate and stick to handling and mixing equipment. This difficulty would be greatly minimized or eliminated by pelletizing.

(10) Each of the grains of silica appears to be wetted by the solution and agent thus making them more susceptible to attack and solution in the melt.

(11) The small amount of organic material in the agent in a pelletized batch is not harmful and may even be useful as a reducing agent in place of the added powdered coal which sometimes is used.

We claim:

1. A method of preparing a glass batch charge which comprises admixing with comminuted glass-forming constituents from about 0.05% to 2% by weight of an alkali forming metal salt of lignosulfonic acid and water in sufficient amount to dampen the mixture and forming the mixture into pellets.

2. A pelletized glass batch comprising glass-forming constituents bonded together in pellet form by from about 0.05% to 2% by weight of alkali forming metal salts of lignosulfonic acid.

3. A method of preparing a glass batch charge as defined in claim 1 wherein said alkali forming metal salt is sodium lignosulfonate.

4. A method of preparing a glass batch charge as defined in claim 1 wherein said alkali forming metal salt is calcium lignosulfonate.

5. A pelletized glass batch as defined in claim 2 wherein said alkali forming metal salt is sodium lignosulfonate.

6. A pelletized glass batch as defined in claim 2 wherein said alkali forming metal salt is calcium lignosulfonate.

References Cited in the file of this patent

UNITED STATES PATENTS

| 2,578,110 | Tooley | Dec. 11, 1951 |
| 2,813,036 | Poole | Nov. 12, 1957 |
| 2,833,659 | Bauer | May 6, 1958 |